(12) United States Patent
Megargel et al.

(10) Patent No.: US 8,983,964 B2
(45) Date of Patent: Mar. 17, 2015

(54) SYSTEM, METHOD AND APPARATUS FOR CONSOLIDATING AND SEARCHING EDUCATIONAL OPPORTUNITIES

(75) Inventors: Bill Megargel, Hudson, FL (US); Levi Richards, Tampa, FL (US); Paul Toomey, Palm Harbor, FL (US)

(73) Assignee: Geographic Solutions, Inc., Palm Harbor, FL (US)

( * ) Notice: Subject to any disclaimer, the term of this patent is extended or adjusted under 35 U.S.C. 154(b) by 192 days.

(21) Appl. No.: 13/086,011

(22) Filed: Apr. 13, 2011

(65) Prior Publication Data

US 2012/0264098 A1 Oct. 18, 2012
US 2014/0287396 A9 Sep. 25, 2014

Related U.S. Application Data

(63) Continuation-in-part of application No. 11/393,394, filed on Mar. 30, 2006.

(51) Int. Cl.
*G06F 17/30* (2006.01)
*G09B 7/02* (2006.01)

(52) U.S. Cl.
CPC ........................................ *G09B 7/02* (2013.01)
USPC ......................................................... 707/740

(58) Field of Classification Search
CPC ................... G06F 17/30598; G06F 17/30705; G06Q 50/20
USPC ......................................................... 707/740
See application file for complete search history.

(56) References Cited

U.S. PATENT DOCUMENTS

| | | | |
|---|---|---|---|
| 7,043,443 B1 * | 5/2006 | Firestone | 705/7.14 |
| 7,480,659 B2 | 1/2009 | Chmura et al. | |
| 2006/0206448 A1 * | 9/2006 | Hyder et al. | 707/1 |
| 2007/0122791 A1 | 5/2007 | Sperle | |
| 2007/0239777 A1 * | 10/2007 | Toomey | 707/104.1 |
| 2008/0010142 A1 | 1/2008 | O'Brien et al. | |
| 2008/0270166 A1 | 10/2008 | Morin et al. | |
| 2008/0301808 A1 | 12/2008 | Calo et al. | |
| 2010/0223194 A1 * | 9/2010 | Adams | 705/327 |
| 2011/0119613 A1 * | 5/2011 | Zhu et al. | 715/771 |

FOREIGN PATENT DOCUMENTS

CA 2614774 A1 1/2007

* cited by examiner

*Primary Examiner* — Rehana Perveen
*Assistant Examiner* — Alexander Khong
(74) *Attorney, Agent, or Firm* — Harvey S. Kauget; Burr & Forman LLP

(57) ABSTRACT

An application for a method and system providing educational seekers a search tool that finds education opportunities across a large number of educational/training providers. The search tool finds courses and/or programs of interest such as certifications, vocational programs, two-year programs, four-year programs, MBA programs, certain financial aide features, specific course offerings, specific sports programs, placement success, etc, The system includes educational software robots called edu bots that visit educational program hosting web sites of the various educational/training providers, extracting information regarding the programs, courses, faculty, financial assistance, sports programs, location, extra-curricular activities, etc. The information is then stored in a common, searchable database for later searching by the educational seeker.

8 Claims, 16 Drawing Sheets

70

Better State University —72

Bachelor's of Arts Degree Program in Computer Science —74

DEGREE REQUIREMENTS —76

The undergraduate program in computer science is limited access. For each academic year a minimum GPA is established by the Department of Computer Science. In addition, students must have completed the State of Florida Common Course Prerequisites (see below) with a grade of "C-" or better in order to be considered for entrance. Upon entrance into the program, the student must maintain a 2.35 GPA. There are two majors for the CS bachelor's degree: computer science (CS), and software engineering (SE). —78

COMMON COURSE PREREQUISITES

Specific prerequisites are required for admission into the upper-division program and must be completed by the student at either a community college or a state university prior to being admitted to this program. —80

1. MAC 1105
2. MAC 1140
3. STA 2122 or STA 2023

CORE REQUIREMENTS —82

1. 2104 Discrete Mathematics I (3)
2. 3100-3103 Computer Organization I-II (6)
3. 4020-4021 Software Engineering I-II (6)
4. 3014 Programming I (3)
5. 3330 Object Oriented Programming (3)
6. 3353 Introduction to Unix (1)
7. 4530 Data Structures, Algorithms, and Generic
8. 4610 Operating Systems and Concurrent Programming
9. 4710 Theory and Structure of Databases

XYZ University, Department of Electrical and Computer Engineering — 91

COURSE: 11:111:111 - Principles of Electrical Engineering I (3) — 92
Circuit elements, circuit analysis, network theorems,
operational amplifiers, power computations.
— 94

Pre-Requisite Courses: 11:111:222 Electricity and magnetism — 96

Co-Requisite Courses: 01:640:251 differential calculus and 14:332:223 complex variables — 98

Textbook & Materials: J. W. Nilsson and S. A. Riedel, Electric Circuits, 8th Ed., Prentice Hall, 2007 — 100

References: MatLab: Student Version, Current Edition, The MathWorks, Inc. — 102

Overall Educational Objective: To develop skills in determining DC and AC steady state solutions to electrical networks, and power computations.

Course Learning Objectives: — 104

1. an ability to define and explain the meaning/function of charge, current, voltage, power, energy, R, L, C, the op amp, and the fundamental principles of Ohm's law, KVL and KCL.
   2. an ability to write the equilibrium equations for a given network and solve them analytically using appropriate software as needed for the steady state solution.
   3. an ability to state and apply the principles of superposition, linearity, source transformations, and Thevenin/Norton equivalent circuits to simplify the analysis of circuits and/or the computation of responses.
   4. an ability to analyze resistive op amp circuits and design inverting, non-inverting, summing, and differential amplifier circuits using op amps.
   5. an in depth understanding of the behavior of inductances and capacitances, and differentiating and integrating op amp circuits.

*FIG. 7*

United Course Finder —112

Search results for course.

[ electronic circuits ] —132

Search results for an individual course:

| Number | School | Description —134 |
|---|---|---|
| 11:111:111 | Rutgers | Circuit elements, circuit analysis, network theorems, op amps, power —136 |
| 56007 | USC | Circuit elements, circuit analysis |
| 99-12345 | USF | Circuit elements, circuit analysis, network theorems |
| 99-12544 | USF | Detail circuit analysis, network theorems, op amps, power circuits |
| 101-300 | ISU | Basic circuit elements, circuit analysis, network theorems |
| 100-3-222 | Tex-AM | Circuit analysis, network theorems |

United Course Finder —112

Course Details. —154 —172

| Number | School | Description |
|---|---|---|
| 11:111:111 | Rutgers | Circuit elements, circuit analysis, network theorems, op amps, power |

Pre-Requisite Courses: 11:111:222 Electricity and magnetism
Co-Requisite Courses: 01:640:251 differential calculus and 14:332:223 complex variables
Textbook & Materials: J. W. Nilsson and S. A. Riedel, Electric Circuits, 8th Ed.,Prentice Hall, 2007
References: MatLab: Student Version, Current Edition, The MathWorks, Inc..
Overall Educational Objective: To develop skills in determining DC and AC steady state solutions to electrical networks, and power computations.

Course Learning Objectives:

1. an ability to define and explain the meaning/function of charge, current, voltage, power, energy, R, L, C, the op amp, and the fundamental principles of Ohm's law, KVL and KCL.
 2. an ability to write the equilibrium equations for a given network and solve them analytically using appropriate software as needed for the steady state solution.
 3. an ability to state and apply the principles of superposition, linearity, source transformations, and Thevenin/Norton equivalent circuits to simplify the analysis of circuits and/or the computation of responses.
 4. an ability to analyze resistive op amp circuits and design inverting, non-inverting, summing, and differential amplifier circuits using op amps.
 5. an in depth understanding of the behavior of inductances and capacitances, and differentiating and integrating op amp circuits.

[Visit School] —174    [Visit Department] —176    170

*FIG. 13*

Programs
Program Name
Program Type – what degree or certification given upon completion of program
Program URL
Program C.I.P. code – federal education code for program
Program Cost
Program Description
Program Requirements – need milestones to enter program
Program Course Hours – credit hours needed to complete program
Program Course List – list of courses that make up the program Courses
Course Name
Course Number – internal course identifying number that does not change from year to year
Course Hours – credit hours awarded when completing course
Course Description
Course Time – includes day, time, period, building, room number, etc
Term – what semester course offered
Campus – where course is held (i.e. "Tampa-Off Campus")
Course Fees – cost not included in tuition: lab fees, travel costs, equipment
Course URL
Course ID – unique identifier

SYSTEM, METHOD AND APPARATUS FOR CONSOLIDATING AND SEARCHING EDUCATIONAL OPPORTUNITIES

CROSS REFERENCES TO RELATED APPLICATIONS

This utility patent application is a continuation-in-part of commonly owned U.S. patent application Ser. No. 11/393,394 filed on Mar. 30, 2006 entitled: "System, method and computer program products for creating and maintaining a consolidated jobs database" this Utility patent application incorporated by reference herein.

FIELD

This invention relates to the field of searching and more particularly to a system, method and apparatus for finding educational program descriptions on a wide area network and importing the descriptions into a central searchable database.

BACKGROUND

Many people, for instance, those about to graduate high school, are looking for educational programs. In the distant past, guidance counselor offices contained countless brochures from various institutions such as colleges, universities, trade schools, etc. With the wide-spread availability of the Internet (World Wide Web), the art has migrated to an online set of catalogs. In such, each school or institution (educational/training provider) has a web site and, one feature of that web site is descriptions of programs, tracts, degree programs, classes, etc. This is a vast improvement over paper catalogs, but neither provides a robust approach to finding the right program for the educational seeker.

There are several weaknesses in the current approach of finding an educational program. First, the educational seeker, looking for a certain type of program, doesn't necessarily know which educational/training provider offer such a program. For example, if a educational seeker from California is interested in studying law to become an attorney, they don't necessarily know about a small private school in the Tampa Bay area of Florida and, therefore, are not prone to visit that educational/training provider's web site to check out the possible class work. Secondly, each educational/training provider's web site is structured differently making it more difficult for the educational seeker to locate the programs once they find the educational/training provider's web site. Some educational/training providers organize by subject, some by degree, etc. There is no normalized hierarchy and/or format for such web sites, making it tedious to navigate through them to find the right program for the educational seeker.

Thirdly, there is no way to find programs based upon specific criterion. For example, if a educational seeker wants to attend a school that has a degree program leading to a master's degree in biology and also wants to have a minor degree in music, the educational seeker must visit many educational/training provider web sites to see if they offer each, having no way to search for all educational/training providers that offer both together. Another example is a educational seeker who desires a degree in chemistry with a minor in music and wants to study in the Pacific Northwest. Again, current technology does not permit such a search.

Additionally, the educational seeker needs to compare one institution to another. Upon finding a few institutions in the Pacific Northwest that offer a degree in chemistry with a minor in music, the educational seeker often needs to compare class schedules, degree requirements, entry requirements, scholarships available, credit hours required, required courses, elective courses available, cost per credit hour, housing, etc. Currently, no single system provides consolidated data for multiple educational/training providers.

Often it is difficult for the educational seeker to determine from an educational/training provider's web site, which location is the parent campus as opposed to a smaller, satellite campus; details on the offered programs; and availability of courses, etc. To get such information, the educational seeker often needs to request a brochure/catalog or call the school.

Prior advances have not addressed a consolidated, searchable database of course and/or program description information. US Pat. Pub. No. 2007/0122791 to Sperle describes a method of updating course catalogs, but does not access a multitude of educational/training provider databases to develop a database of course and/or program information. US Pat. Pub. No. 2008/0270166 describes a method of transferring a educational seeker's transcript over the web, but does not access a multitude of educational/training provider databases to develop a database of course and/or program information.

In addition, governments are charged with the task of reducing unemployment. To this end, it is desired to have a system that, coupled with an workforce management application, identifies positions available in a certain area and, when a limited number of such positions are available, the system suggests related positions and, if additional training is needed to file those positions, presents local courses for the individual to train in the area of the positions that are in higher demand. No such system is currently available. For example, if a jobseeker is trying to find a position as a certified network administrator and there are few or no positions that match that criteria in the area of the jobseeker but there are related positions such as Web Development, but the jobseeker lacks a skill generally needed for Web Development (e.g. C++ programming), a desired feature of a system will identify the positions available and the needed course and provide a list of courses that the jobseeker can take to prepare and apply for the Web Development positions.

In another example, a job seeker has skills to be an administrative assistant, but a search of open positions finds very few. The search finds several positions as a paralegal, but the job seeker lacks training to be a paralegal, but in the prior art, the system did not present a list of paralegal training programs provided in the locale of the jobseeker that, if completed, qualified the jobseeker for the open positions as a paralegal.

Systems that "spider" the Internet for job postings are known. For example, U.S. patent application Ser. No. 11/393,394, filed on Mar. 30, 2006, titled, "SYSTEM, METHOD AND COMPUTER PROGRAM PRODUCTS FOR CREATING AND MAINTAINING A CONSOLIDATED JOBS DATABASE" describes a system for spidering job postings from various web sited containing job postings and storing the job postings in a searchable database. This patent application is here within included by reference.

What is needed is a system that will identify educational program opportunities, consolidate the individual opportunities into a central location and provide advanced searching capabilities to the educational seeker for finding educational opportunities that match the educational seeker's needs and desires.

SUMMARY OF THE INVENTION

A method and system for prospective educational seekers to seek out education opportunities across a large number of educational/training providers to find courses and/or programs of interest such as training, certifications, two-year programs, four-year programs, MBA programs, certain financial aide features, specific course offerings, specific sports programs, placement success, etc. The system uses educational software robots, edu bots, to visit web sites of the various educational/training providers (schools, institutions, etc), extracting information regarding the programs, courses, faculty, financial assistance, sports programs, location, extra-curricular activities, etc. The information is then stored in a common, searchable database for later searching by the educational seeker.

In one embodiment, a system for creating and updating educational program and course information in a searchable database is disclosed. The system includes a computer connected to a network with a storage device operationally interfaced to the computer. A searchable database is stored within the storage device. The system includes a plurality of edu bots. Each of the edu bots is independently programmed by a programmer to visit an assigned educational program and course information hosting site through the network. Each of the edu bots is independently programmed by the programmer to extract educational program and course information from the visited educational program and course information hosting site. Each of the edu bots is independently programmed by the programmer to update the searchable database with the educational program and course information. The system includes a dispatcher running on the computer. The dispatcher periodically runs the plurality of edu bots. Each edu bot is customized for each particular educational program and course information hosting site.

In another embodiment, a method for creating and updating a consolidated database of educational programs and courses is disclosed. The method includes the steps of manually identifying a set of educational programs and courses hosting sites and for each site within the set: manually programming and testing an edu bot specific to the each site by a programmer. The edu bot is programmed to visit said each site and to extract educational program and course information from said each site and to store the educational program and course information in a searchable database. The method includes running the edu bot to visit said each site and extract the educational program and course information into the searchable database and periodically running the edu bots to update the searchable database.

In another embodiment, computer readable storage medium including computer programming instructions that cause a computer to perform the method for creating and updating a consolidated database of educational program and course information is disclosed. The method includes the steps of accepting a list of educational program and course information hosting sites having educational program and course information therein then, for each site within the list of educational program and course information hosting sites: creating an edu bot programmed to visit said each site and programmed to extract educational program and course information stored at said each site and the edu bot programmed to store the educational program and course information in a searchable database; running the edu bot to visit said each site and to extract the educational program and course information and to store the educational program and course information in the searchable database; and periodically running the edu bots to update the searchable database. Each of the computer programming instructions comprising each of the edu bots is programmed independently by a software developer based upon said each site.

In another embodiment, a computer program product used with a computer system in creating and updating a consolidated database of educational program and course information is disclosed including a plurality of identified educational program and course information hosting sites and a computer usable medium having computer-readable code means embodied in the medium. The computer-readable code means includes a plurality of edu bots. Each edu bot has a plurality of computer usable code for extracting educational program and course information from a respective educational program and course information host site of the plurality of identified educational program and course information hosting sites. Each edu bot also has a plurality of computer readable code for updating a searchable database with the educational program and course information. Each of the computer readable code is written independently by a programmer and customized for each of the plurality of identified educational program and course information hosting sites.

BRIEF DESCRIPTION OF THE DRAWINGS

The invention can be best understood by those having ordinary skill in the art by reference to the following detailed description when considered in conjunction with the accompanying drawings in which:

FIG. 6 illustrates a first typical educational program web page of the prior/current art.

FIG. 7 illustrates a first typical educational program web page of the prior/current art.

FIG. 10 illustrates a typical response user interface for displaying educational programs.

FIG. 13 illustrates a course display user interface for retrieving educational programs.

FIG. 14 illustrates an exemplary schema of a database used for retrieving educational programs.

DETAILED DESCRIPTION

Figure 1:
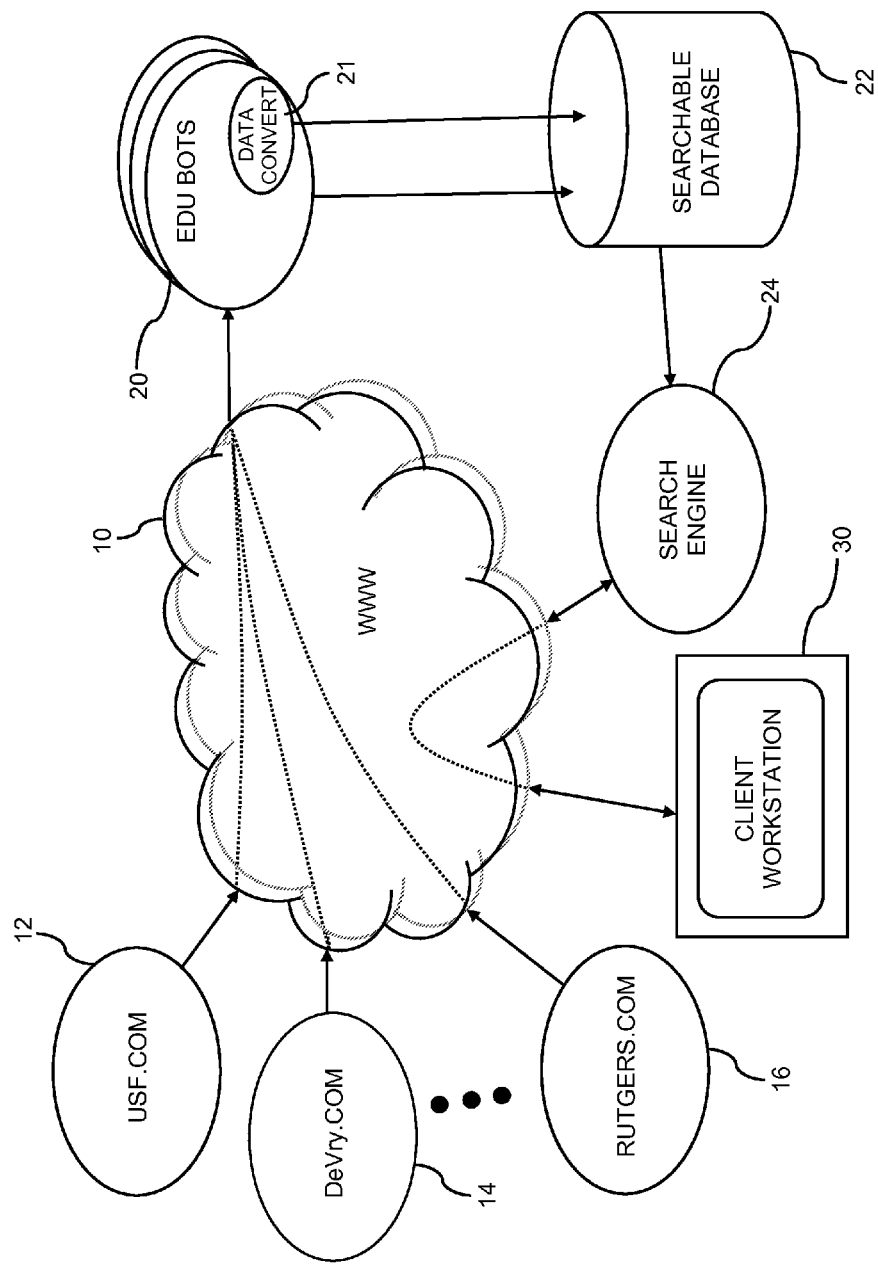
FIG. 1 illustrates a schematic view of a system of a first embodiment.

Reference will now be made in detail to the presently preferred embodiments, examples of which are illustrated in the accompanying drawings. Throughout the following detailed description, the same reference numerals refer to the same elements in all figures. This disclosure relates to all types of educational/training providers including, but not limited to, training schools, certification schools, universities, colleges, technical institutes, learning centers, traffic schools, driver education schools, etc.

Referring to FIG. 1, a schematic view of a system of a first embodiment is shown. Educational/training providers host web sites that describe their educational programs. One or more Edu bots 20 periodically visit these educational program hosting sites 12/14/16 to extract educational program offering information. The educational program hosting sites 12/14/16 are, for example, state university admission posting web sites such as the University of Southern Florida (USF) 12 and Rutgers 16; private education web sites such as Devry 14 and any known web site containing educational program information. This includes sites in the USA as well as outside of the USA.

An Edu bot 20 is, for example, a software module that is programmed to visit a web site that contains descriptions of one or more educational programs or offerings, extracts the descriptions and, if needed, normalized the descriptions for storage in the searchable database 22. It is anticipated that, for some web sites, multiple Edu bots 20 are used due to differences between descriptions of different educational opportunities, for example, when different departments within a University use different formats for their educational program descriptions. It is also anticipated that, for some web sites, a single Edu bot 20 is programmed to extract educational descriptions from multiple web sites being that those web sites share, for example, a common format. In one embodiment, the Edu bots 20 are written by a person (programmer) given the target web site(s) and tested before contributing to a live, searchable database 22. In some embodiments, the Edu bots 20 are generated or partially generated by software, then completed and tested before contributing to a live, searchable database 22.

A list of the target educational/training provider sites is created by a person searching the network for such sites. For each particular hosting site such as sites 12/14/16, there is one or more corresponding edu bot 20 designed/programmed to find educational program content, parse information from the educational program content, normalize the information and store the information in the searchable educational course information database 22. For much of the information found in the educational information, the data is copied directly into a record of the searchable educational course information database 22. For example, the schema of the searchable educational course information database 22 has a field for pre-requisites and the hosting site has a field for entry require-ments, then that field is copied directly into the searchable record for that educational program data record. Alternately, if the educational program has a field for class meeting sched-ule (e.g. M/T/F 8:00 AM) and the searchable educational course information database 22 has a field for course meeting days and another field for course meeting time, then the field is parsed to place "M/T/F" into the field for course meeting days and "8:00 AM" in the field for meeting time by a data conversion routine 21.

The educational seekers (educational seeker) access the searchable database 22 through a search engine 24 that pre-sents a search user interface on the educational seekers' work-station 30 (e.g. personal computer, hand-held device, cellular phone, etc). An educational seeker is a person who is inter-ested in finding information about educational programs. In the past, the educational seeker needed knowledge about various educational/training providers such as technical schools, vocational training, colleges, universities, etc., in order to know how to search the Internet for such offerings. By merging many of the possible course descriptions from many different educational offerings into a searchable database 22 and providing search tools, the educational seeker need only search one searchable database 22 to find offerings from many different educational/training providers.

Similarly, a job seeker is a person who is interested in finding a job. In embodiments in which the searchable database 22 (either the same searchable database 22 or a different searchable database 22), the job seeker provides their qualifications and preferences and the search engine 24 finds all job postings in the searchable database 22 that match these qualifications and preferences. In some embodiments, as will be discussed, the search engine 24 has knowledge of relationships between job categories and knowledge of the prerequisites needed for the job categories and, the search engine 24 expands the search to find similar job postings to those matching the job seeker's qualifications and, using educational data in the searchable database 22, the search engine 24 presents the expanded results along with educational requirements and possible educational programs that the job seeker need take in order to apply for job positions in the expanded results.

Many different types of searches and output reports are anticipated ranging from a simple search to a very complex search and detailed report. An example of a simple search is "show me all CNA training classes in Florida." and an example of a more complex search is "show me all 4-year schools in Florida with majors in Biology and provide entrance requirements." The former, for example, results in a list of educational/training providers. The later, for example, results in a list of educational/training providers along with entry requirements for each school/curriculum. For example, one educational/training provider requires a SAT score of 1000 for all students, but then for biology students, freshmen are required to take Chemistry I and II and at least two humanities classes, etc. The generated report include any or all data including the day/time of class meeting, location of classes, lab requirements, credit hours, teacher/professor, cost, cost per credit, pre-requisites, co-requisites, degree requirements, language of instruction, course/program goals, financial aid, placement programs, certifications of faculty, degree programs, certifications, etc.

Figure 2:
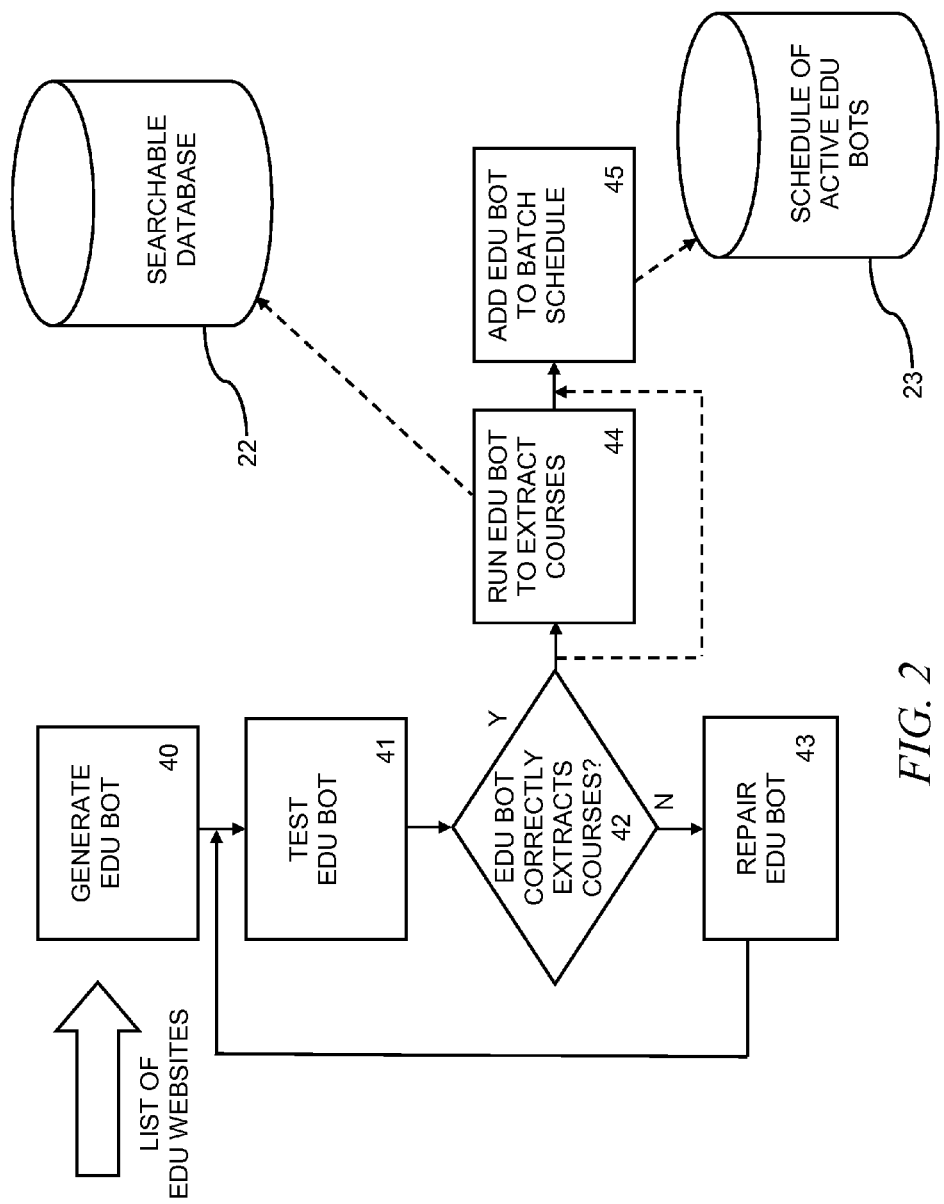
FIG. 2 illustrates a first flow chart of a system for retrieving educational programs from disparate web sites.

Referring to FIG. 2, a first flow chart of a system for retrieving educational programs from disparate web site is shown. A list of educational program hosting websites is compiled. This is done by a person searching for websites and looking for at least one educational program and then adding the address (URL) of that educational program hosting sites into a list of educational program hosting sites. Next, one or more programmers generate 40 an edu bot 20 for one of the hosting sites in the list. The programmer uses the location of the educational program postings from the list and a sample of a educational program description from that site to create the edu bot 20 for that particular hosting sites. The edu bot 20 is written in any desired programming language, preferably using a scripting language. Once created, the edu bot 20 is tested 41 by running it against the target hosting site(s) and if it doesn't find and parse the educational program data from that site or generates erroneous outputs 42, it is repaired 43 and the previous two steps 41/42 are repeated until the edu bot 20 operates correctly. Once running correctly, the edu bot 20 is optionally run 44 to extract the educational program post-ings from the target educational site and add them to the searchable educational program database 22 and the edu bot 20 is added 45 to the edu bot batch schedule (schedule of active edu bots 23) so it is scheduled to run on a regular basis to extract any new educational program postings or changed postings from that educational posting web site.

Figure 3:
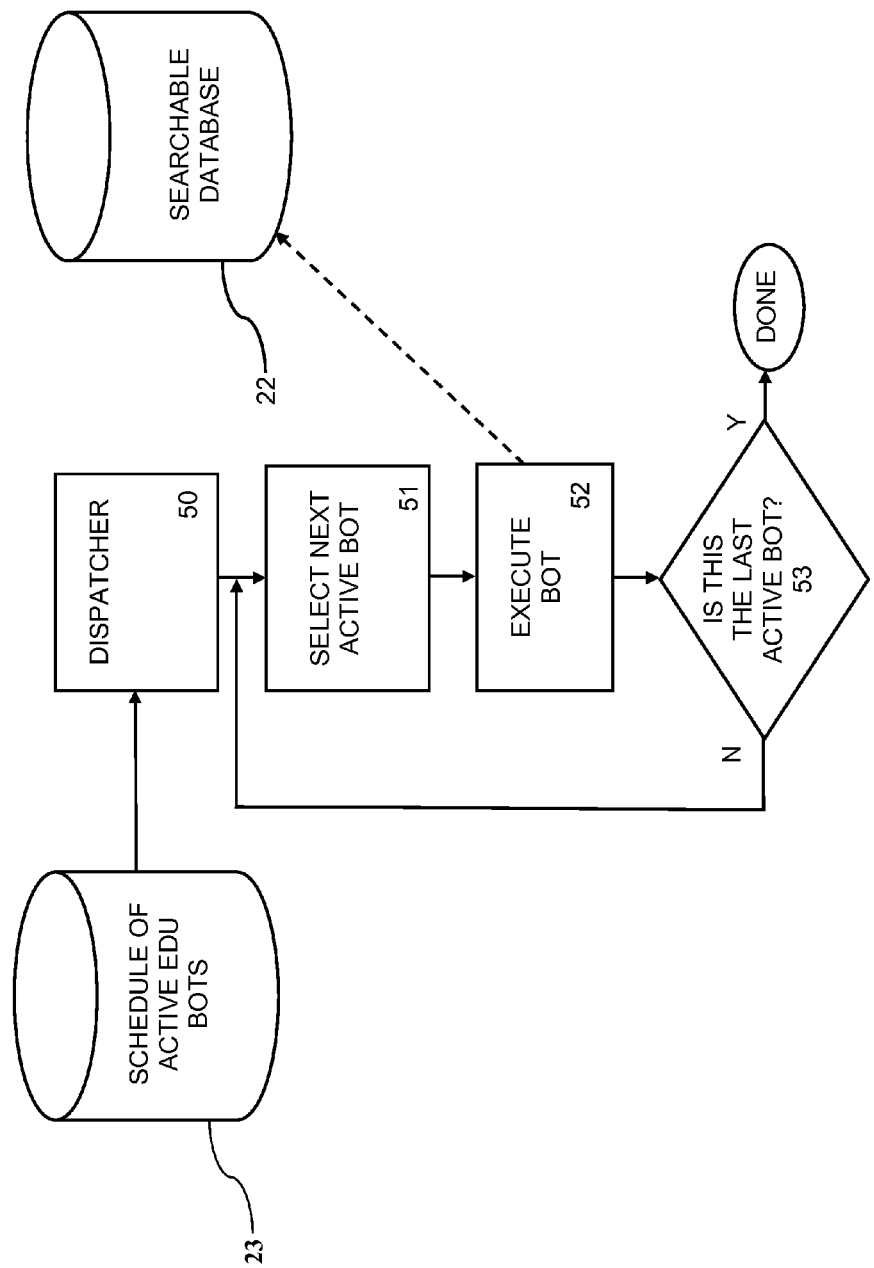
FIG. 3 illustrates a second flow chart of a system for retrieving educational programs from disparate web sites.

Referring to FIG. 3, a second flow chart of a system for retrieving educational programs from disparate web sites is shown. The schedule of active edu bots 23 created by the previous step (see FIG. 2) is coupled to a dispatcher 50. The dispatcher periodically goes through the schedule of active edu bots 23 and executes one or more edu bots 20 in order to update the searchable educational program database 22. In the preferred embodiment, the dispatcher 50 wakes up during the evening and executes all available edu bots 20. Alternately, the dispatcher 50 wakes up at any time based upon the selection of an administrator. In some embodiments, the edu bots 20 are executed sequentially while in other embodiments, several edu bots 20 are executed concurrently. In some embodiments, several edu bots 20 run on a single server while in other embodiments, there are multiple servers and one or more edu bots 20 are run concurrently on each of the servers.

There are many ways known in computer operating systems to schedule a dispatcher 50 including the UNIX cron(1) table, and any method works well in the present invention. When the dispatcher 50 runs, it selects all or a subset of the active edu bots from the schedule of active edu bots 23, selecting the next one from a list 51 and executing it 52, whereby the edu bot 20 updates the searchable educational program database 22 with any new, changed or deleted educational program information from the job hosting web site associated with that edu bot 20. If there are more active edu bots in the list 53, the previous two steps 51/52 are repeated until none are left. When the edu bot 20 is executed, it spiders its respective educational program hosting web site 12/14/16 and updates the searchable educational program database 22 with any changes to existing educational programs or the addition of any new educational programs found. If a previously extracted educational program is no longer present on that web site 12/14/16 for a period of time, it is marked as "no-longer-offered" or it is removed from the searchable educational program database 22. This time period allows the educational program to remain in the searchable educational program database 22 even if it cannot be found at the hosting site. The entry in the educational program database 22 remains, at least for a period of time, in case the hosting site is unavailable for maintenance, etc.

Figure 4:
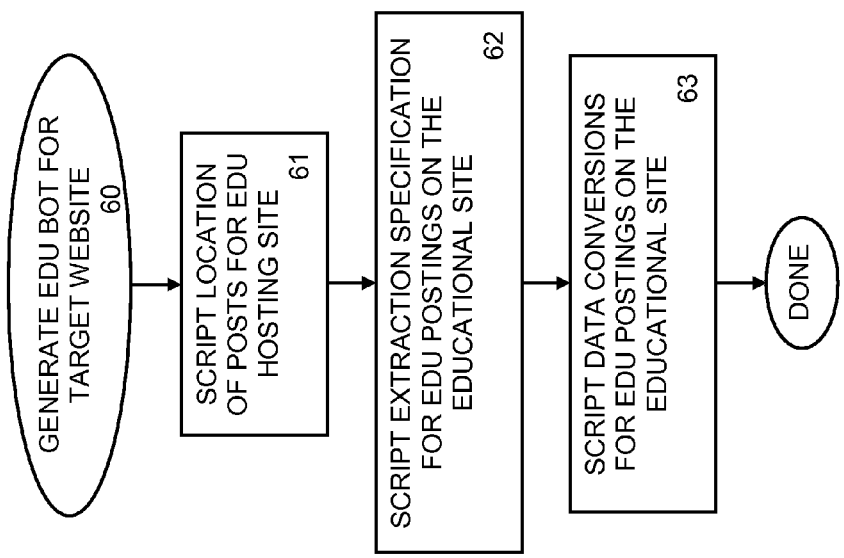
FIG. 4 illustrates a second flow chart of a system for retrieving educational programs from disparate web sites.

Referring to FIG. 4, a second flow chart of a system for retrieving educational programs from disparate web sites is shown. The task of generating an edu bot 20 for a target educational program hosting sites 60 includes (in any order) adding the location of the target educational program hosting sites 61 to the edu bot 20, adding extraction specification scripts 62 for the target web site 12/14/16 to the edu bot 20 and adding data conversion scripts for the target web site 63 to the edu bot 20. The location of the target educational program hosting sites 61 include, for example, the home page where the edu bot starts to "walk," the home page to find active educational program descriptions or, in some embodiments, one or more individual sub-pages, each containing one or more pointers to educational programs hosted on the web site. The extraction scripts include information leading to the location of each field within the educational descriptions on the hosting sites and can be an absolute field location (e.g., row and column) or a field title string (e.g., "Name:") or any other means for finding a specific field. The edu bot is be written in any desired programming language, preferably a scripting language.

Figure 5:
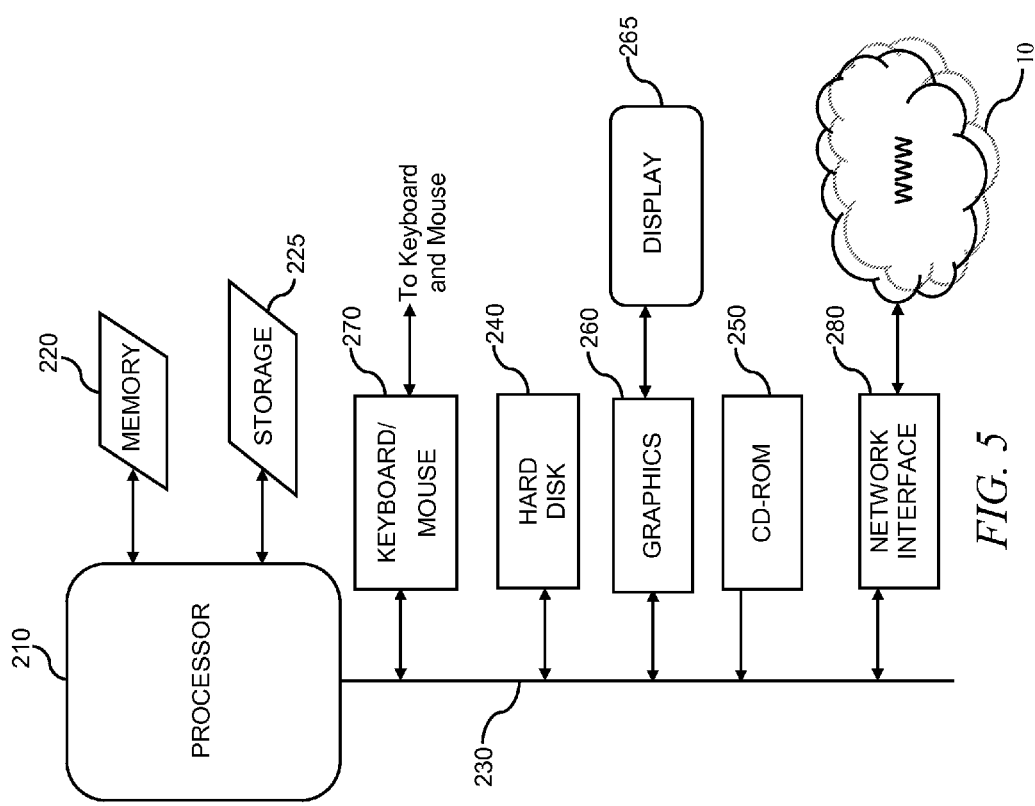
FIG. 5 illustrates plan view of a typical computer system used for clients and/or servers.
Figure 5A:
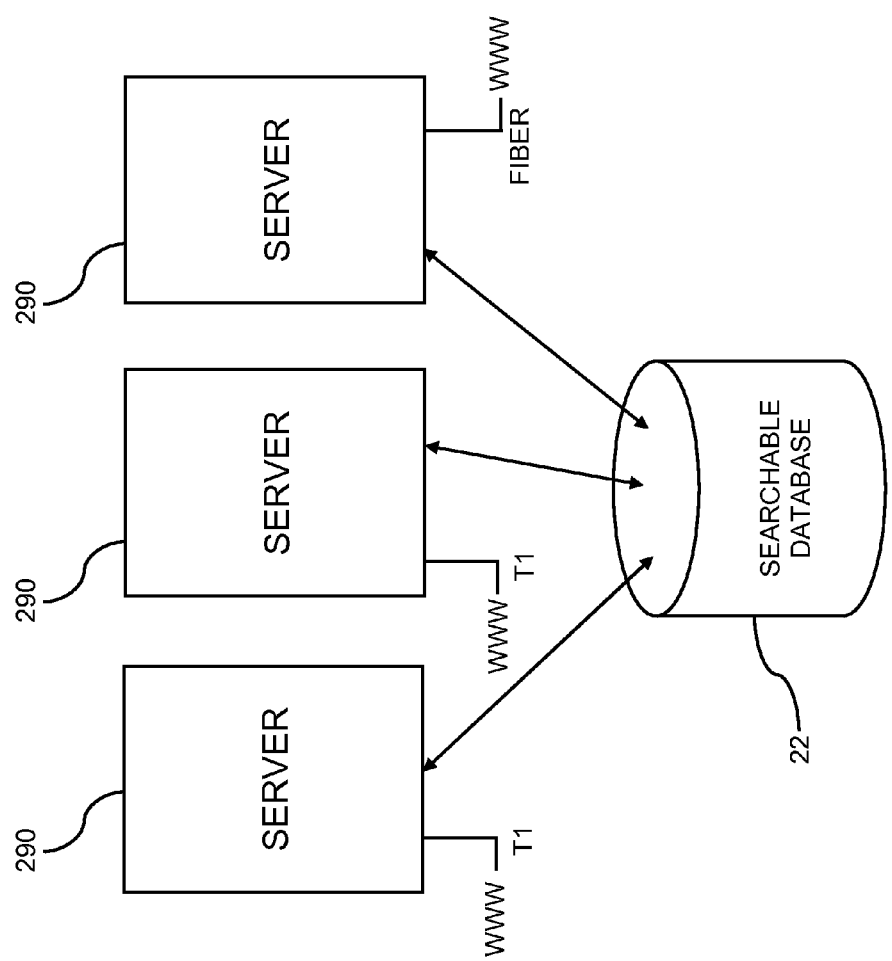
FIG. 5A illustrates plan view of a typical multi-server computer system used for retrieving educational programs and searching the retrieved data.

Referring to FIG. 5 and FIG. 5a, a schematic block diagram of an exemplary computer system of the present invention is shown. Although shown in its simplest form, having a single processor, many different computer architectures are known that accomplish similar results in a similar fashion and the present invention is not limited in any way to any particular computer system. The present invention works well utilizing a single processor system as shown in FIG. 5, a multiple processor system where multiple processors share resources such as memory and storage, a multiple server system (as in FIG. 5a) where several independent servers operate in parallel and have a copy or shared access to the searchable educational program database 22 or any combination.

In this sample architecture, a processor 210 is provided to execute stored programs that are generally stored for execution within a memory 220. The processor 210 can be any processor or a group of processors, for example an Intel Pentium-4® CPU or the like. The memory 220 is connected to the processor and can be any memory suitable for connection with the selected processor 210, such as SRAM, DRAM, SDRAM, RDRAM, DDR, DDR-2, etc. Firmware is stored in firmware storage 225 that is connected to the processor 210 and may include initialization software known as BIOS. This initialization software usually operates when power is applied to the system or when the system is reset.

Also connected to the processor 210 is a system bus 230 for connecting to peripheral subsystems such as a network interface 280, a hard disk 240, a CDROM 250, a graphics adapter 260 and a keyboard/mouse 270. The graphics adapter 260 receives commands and display information from the system bus 230 and generates a display image that is displayed on the display 265.

In general, the hard disk 240 may be used to store programs, executable code and data persistently, while the CDROM 250 may be used to load said programs, executable code and data from removable media onto the hard disk 240. These peripherals are meant to be examples of input/output devices, persistent storage and removable media storage. Other examples of persistent storage include core memory, FRAM, flash memory, etc. Other examples of removable media storage include CDRW, DVD, DVD writeable, compact flash, other removable flash media, floppy disk, ZIP®, laser disk, etc. In some embodiments, other devices are connected to the system through the system bus 230 or with other input-output connections. Examples of these devices include printers; mice; graphics tablets; joysticks; and communications adapters such as modems and Ethernet adapters.

The network interface 280 connects the computer-based system to the world-wide-web 10, preferably, through a high speed link such as a cable broadband connection, a Digital Subscriber Loop (DSL) broadband connection, a T1 line or a T3 line.

FIG. 5a shows a set of servers 290, each having access to the searchable educational program database 22. In this example, edu bots 20 are preferably run in parallel on each server 290, accessing the educational program hosting sites through, in this example, a serial T1 line operating at 1.44 Mbps providing access to the world-wide-web (www) or any known broadband connection including, but not limited to cable, fiber, copper, DSL and T3, etc.

Referring to FIG. 6, a first typical educational program web page 70 of the prior/current art is shown. This is a typical high-level degree web page that a person seeking such an educational opportunity sees by directly accessing a hosting web site 12/14/16. Unfortunately, to find such a page using the prior art, a seeker needs to know that a certain educational/training provider offers this program, then must find the main web site for that institution, then must navigate that web site to find information related to their educational need. Finding a complete, or almost complete, set of courses available for a certain criteria is almost impossible utilizing the prior art without undo searching. Trained educational program searchers know what to look for and how to find such programs, while the novice often misses important opportunities because some sites use different keywords and/or description nomenclature.

The edu bots 20 are programmed to visit the educational program hosting site 70 and extract the information from such a web page 70 and place the extracted information in a record within the searchable education program database 22. For this exemplary web page 70, the educational institution 72 is extracted and placed in a record. From the page 70 content, it is determined that the page 70 is a description of a degree program (e.g. BA in Computer Science 74) and the record is marked accordingly (e.g. 4-year degree, bachelors). Degree requirements such as minimum GPA required to maintain the program 76 are extracted, normalized and placed in the record. For example, the required GPA 78 (2.35) is captured and placed in the record. If found, a list of prerequisites 80 is extracted and placed in the record. Since records of the prerequisite courses are also stored in the searchable educational program database 22, links and/or pointers to the prerequisites are stored in the record for fast access to these courses. If found, a list of required courses 82 are extracted and placed in the record. Again, since images of the prerequisite courses are also stored in the searchable educational program database 22, links and/or pointers to the prerequisites are stored in the record for fast access to these courses. This is a sample of the data that is extracted from the page 70 and it is anticipated that other data are captured such as year offered, class days, times, professor names, class locations, credit hours, costs, on-line availability, etc. In addition, in some embodiments, school-wide data for the institution is included in the record or pointed to by the record such as campus maps, room/board information, fees, book store, activities, academic year calendar, transportation, near-by attractions, etc.

Referring to FIG. 7, a typical educational program web page 90 of the prior/current art is shown. This is what a seeker sees when accessing a typical web page 90 having a course description. The page 90, in this example, includes a title 91 indicating the educational/training provider and/or department and a sub-title 92 indicating the course number and synopsis. In this example, the page 90 includes one prerequisite course 94 and several co-requisite courses 96. Also, the class text book 100 that will be used is includes as well as an overall objective 102 and detailed objectives 104. The edu bot 20 extracts the data 91/92/94/96/98/100/102, transforms/normalizes the data 91/92/94/96/98/100/102 and stores it in a searchable record within the searchable educational program database 22. An example of a transformation is to recognize certain acronyms such as "R, L and C" and either transform them into "Resistors, Inductors and Capacitors" or provide hot-links to definitions for those who are not familiar with the subject material.

Figure 8:
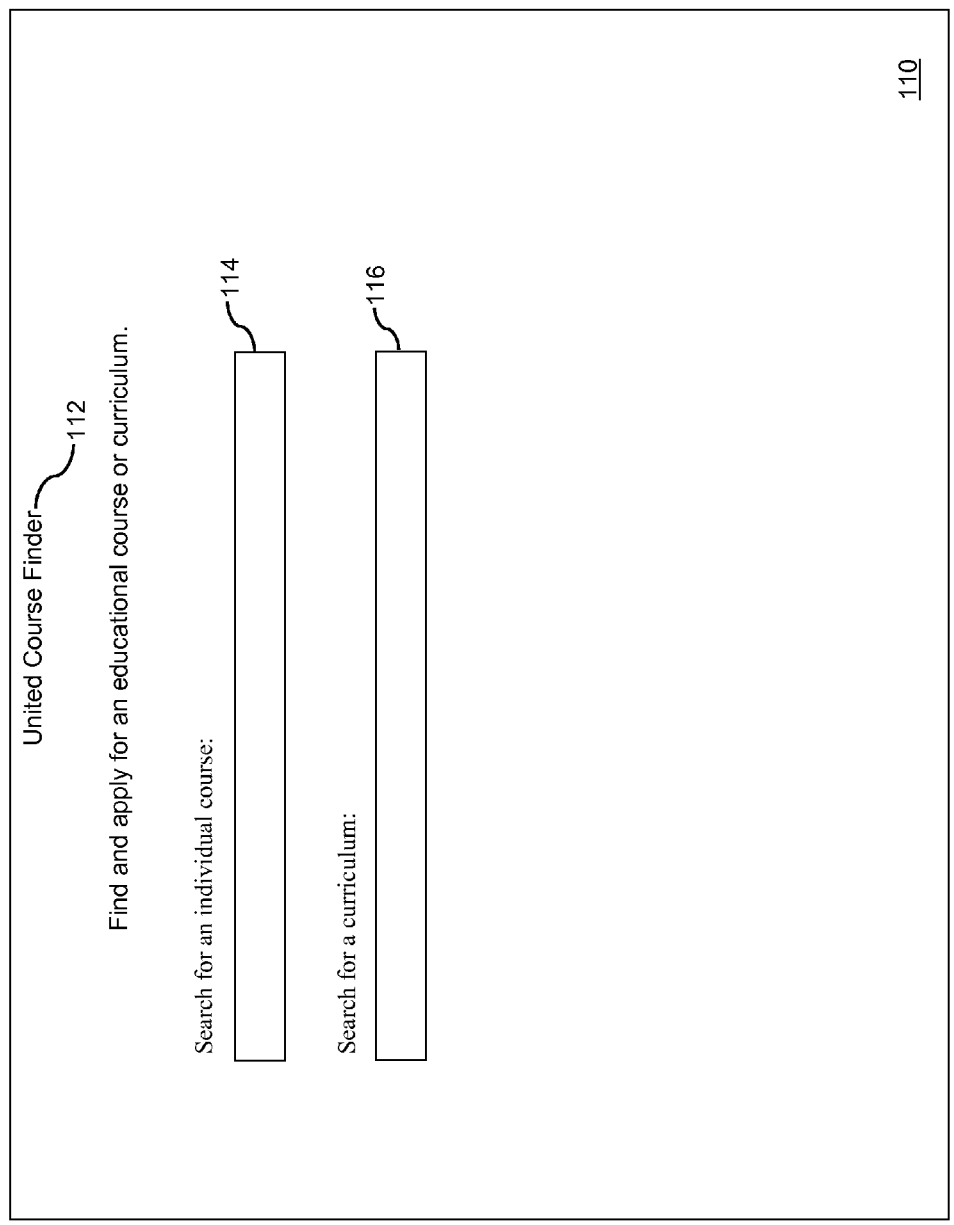
FIG. 8 illustrates a first typical user interface for retrieving educational programs.

Referring to FIG. 8, a first typical user interface 110 for retrieving educational programs is shown. In this, the educational seeker has, for example, the ability to search for an individual course 114 (e.g. electronic circuits) or to search for a curriculum 116 (e.g. BS in electronics). This is shown as an example and many other search criteria and search options are anticipated such as Boolean search capabilities, field search capabilities, etc.

Figure 9:
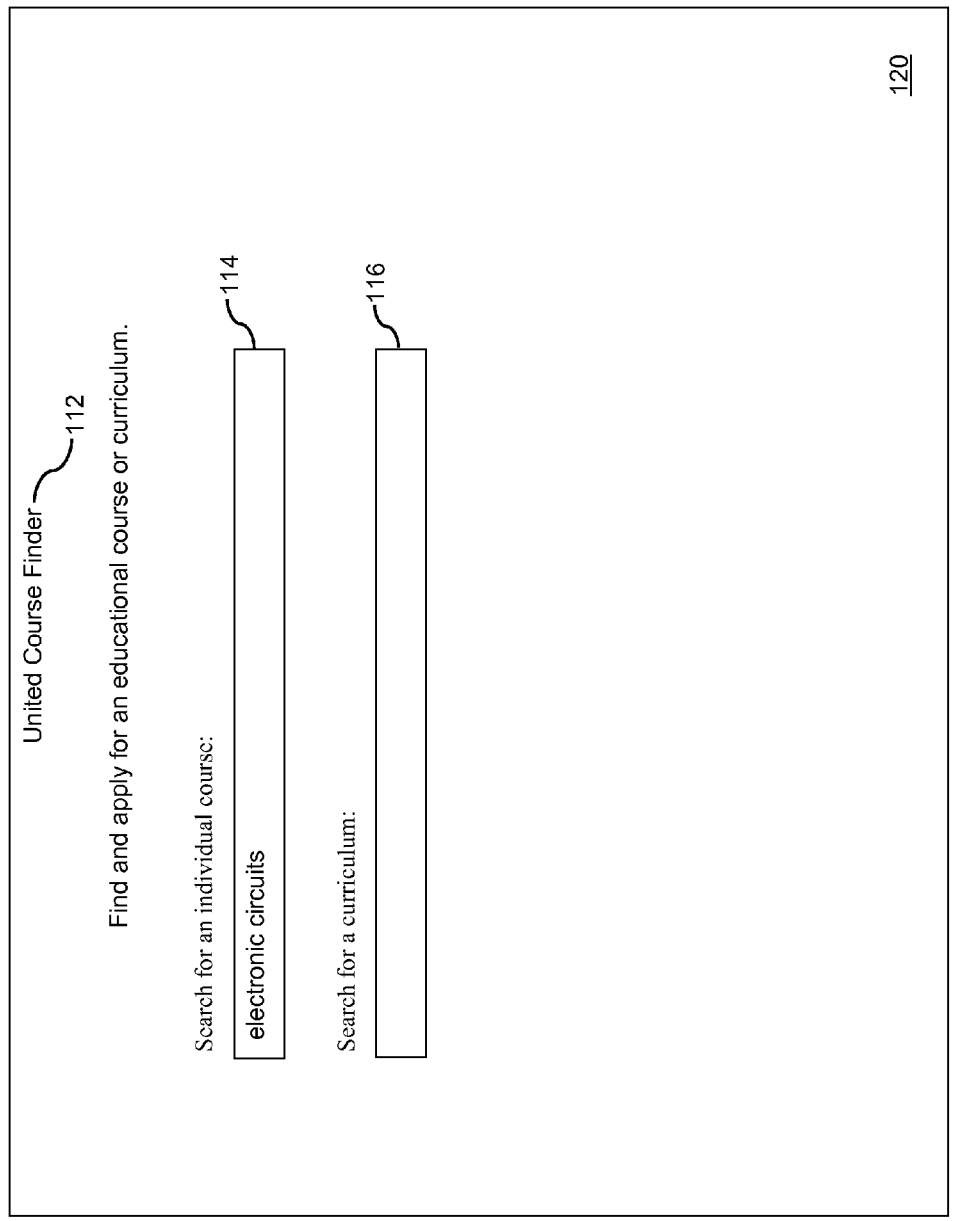
FIG. 9 illustrates a second typical user interface for retrieving educational programs.

Referring to FIG. 9, a completed typical user interface 120 for retrieving educational programs is shown. In this, the educational seeker has, for example, entered a search criteria "electronic circuits" to search for an individual course 114 (e.g. electronic circuits). This is shown as an example and many other search criteria and search options are anticipated such as Boolean search capabilities, field search capabilities, etc.

Referring to FIG. 10, a typical response user interface 130 for displaying educational programs is shown. The original search criteria "electronic circuits" 132 is shown. In some user interfaces, the educational seeker is able to enter different criteria into the search criteria section 132 and initiate a subsequent search as known in the industry. The search results are shown as a list with a title 134 and course descriptions 136. For example, a class number 100-3-222 138 is offered at Texas A&M 140 for "Circuit Analysis, network theorems." Many other formats and presentations are anticipated. In some embodiments, part or all of each course is or includes a hyper-link and, clicking on the hyper-link initiates browsing to, for example, a detailed description of the course (see FIG. 13) or to the target educational/training provider's web site.

Figure 11:
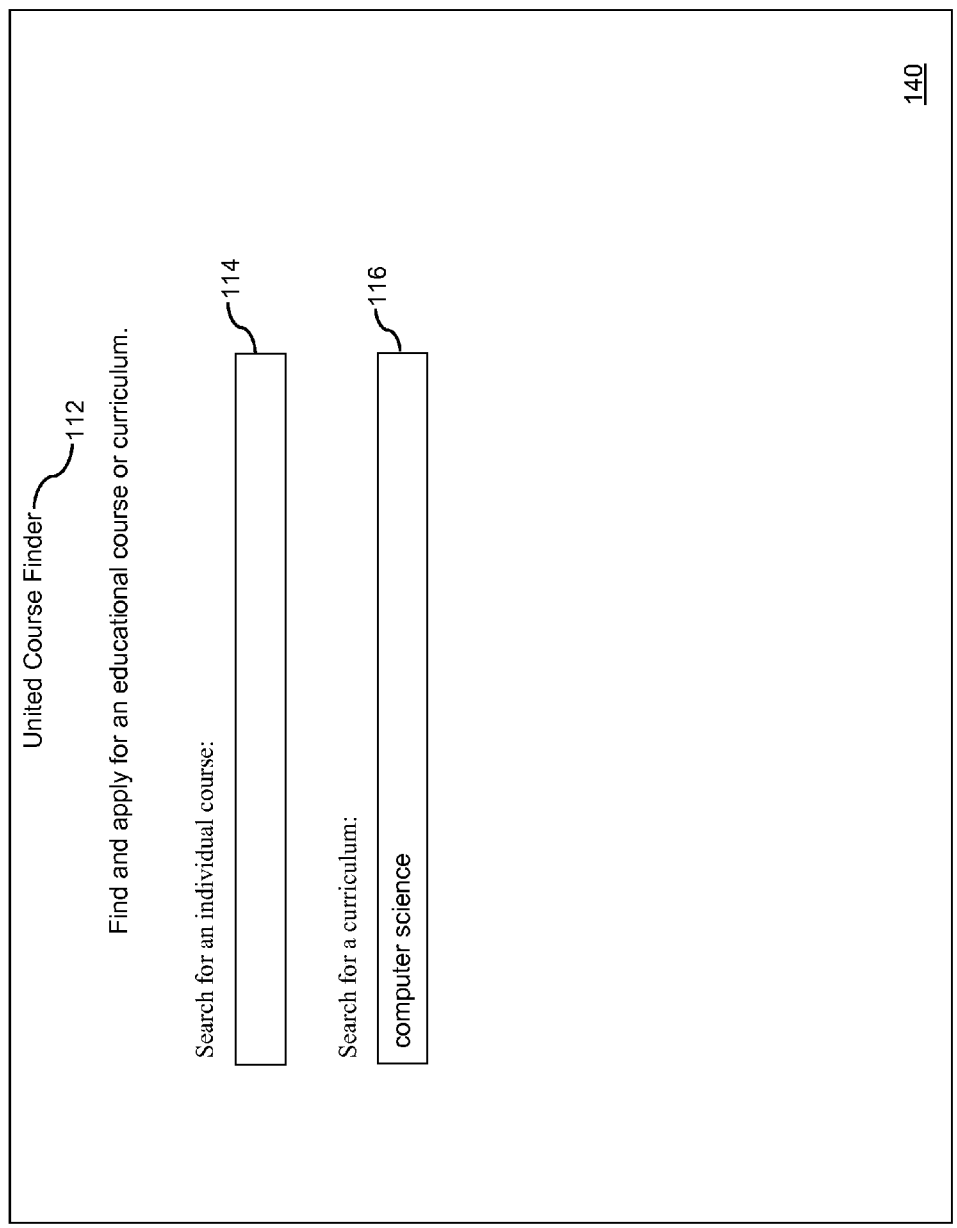
FIG. 11 illustrates a completed typical user interface for retrieving educational courses.

Referring to FIG. 11, a completed typical user interface 140 for retrieving educational courses is shown. In this, the educational seeker has, for example, entered a search criteria "computer science" into the "search for curriculum" 116 to search for a program. This is shown as an example and many other search criteria and search options are anticipated such as Boolean search capabilities, field search capabilities, etc.

Figure 12:
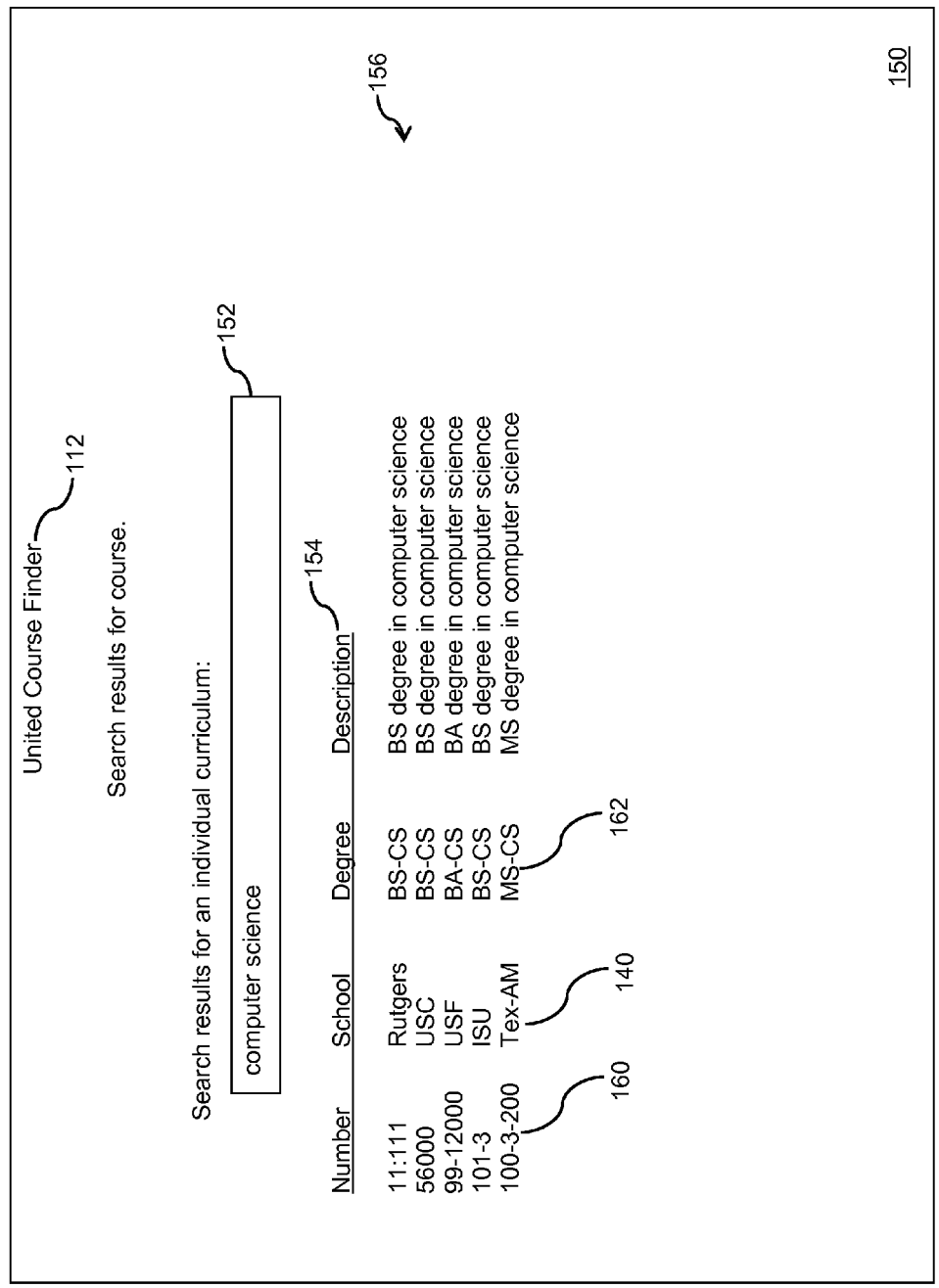
FIG. 12 illustrates a typical response user interface for displaying educational programs.

Referring to FIG. 12, a typical response user interface 150 for displaying educational programs is shown. The original search criteria "computer science" 152 is shown. In some user interfaces, the educational seeker is able to enter different criteria into the search criteria section 152 and initiate a subsequent search as known in the industry. The search results are shown as a list with a title 154 and program descriptions 156. For example, a program number 100-3-200 160 is offered at Texas A&M 140 leading to a Masters Degree in Computer Science 162. Many other formats and presentations are anticipated. In some embodiments, part or all of each program is or includes a hyper-link and, clicking on the hyper-link initiates browsing to, for example, a detailed description of the course or to the target educational/training provider's web site.

Referring to FIG. 13, a course display user interface 170 for retrieving educational programs is shown. Once the educational seeker finds a course of interest as in FIG. 10, the educational seeker selects the course by, for example, clicking on the course hyper-link and a course display user interface 170 is displayed. The course display user interface 170 includes, for example, the course number, educational provider name and brief description 154 as well as a detailed description of the course 172 including, for example, prerequisites, co-requisites, text books, references, objectives, and other information if available such as professor, location and time of the course, etc. The interface shown in FIG. 13 is an example and any other format, presentation or content are anticipated.

Once the educational seeker has determined that they have some interest in the displayed course summary, the educational seeker has navigation buttons to, for example, visit the associated educational/training provider's web site 174 or the associated educational/training provider's home department 176 or the actual educational/training provider's web page for that course (not shown).

Referring to FIG. 14, exemplary schema 200 of a database used for retrieving educational programs is shown. This is but an example of a schema for the searchable database 22 and many other variations, orders and formats are anticipated. A typical schema for records relating to programs includes a Program Name, Program Type (e.g. what degree or certification given upon completion of program), Program URL (for navigation to the educational/training provider's web site), Program C.I.P. code (federal education code for program), Program Cost, Program Description, Program Requirements (e.g. needed milestones to enter program), Program Course Hours (e.g. credit hours needed to complete program) and Program Course List (e.g. a list of courses that make up the program).

A typical schema for records relating to individual courses includes a Course Name, Course Number (e.g. internal course identifying number that does not change from year to year), Course Hours (e.g. credit hours awarded when completing course), Course Description, Course Time (e.g. day, time, period, building, room number, etc), Term (e.g. what semester or trimester course offered), Campus (e.g. where course is held for example "main campus"), Course Fees (e.g. cost not included in tuition such as lab fees, travel costs, equipment), Course URL (for navigation to the educational provider's web site), Course ID (e.g. a unique identifier for making all similar courses unique), etc.

Figure 15:
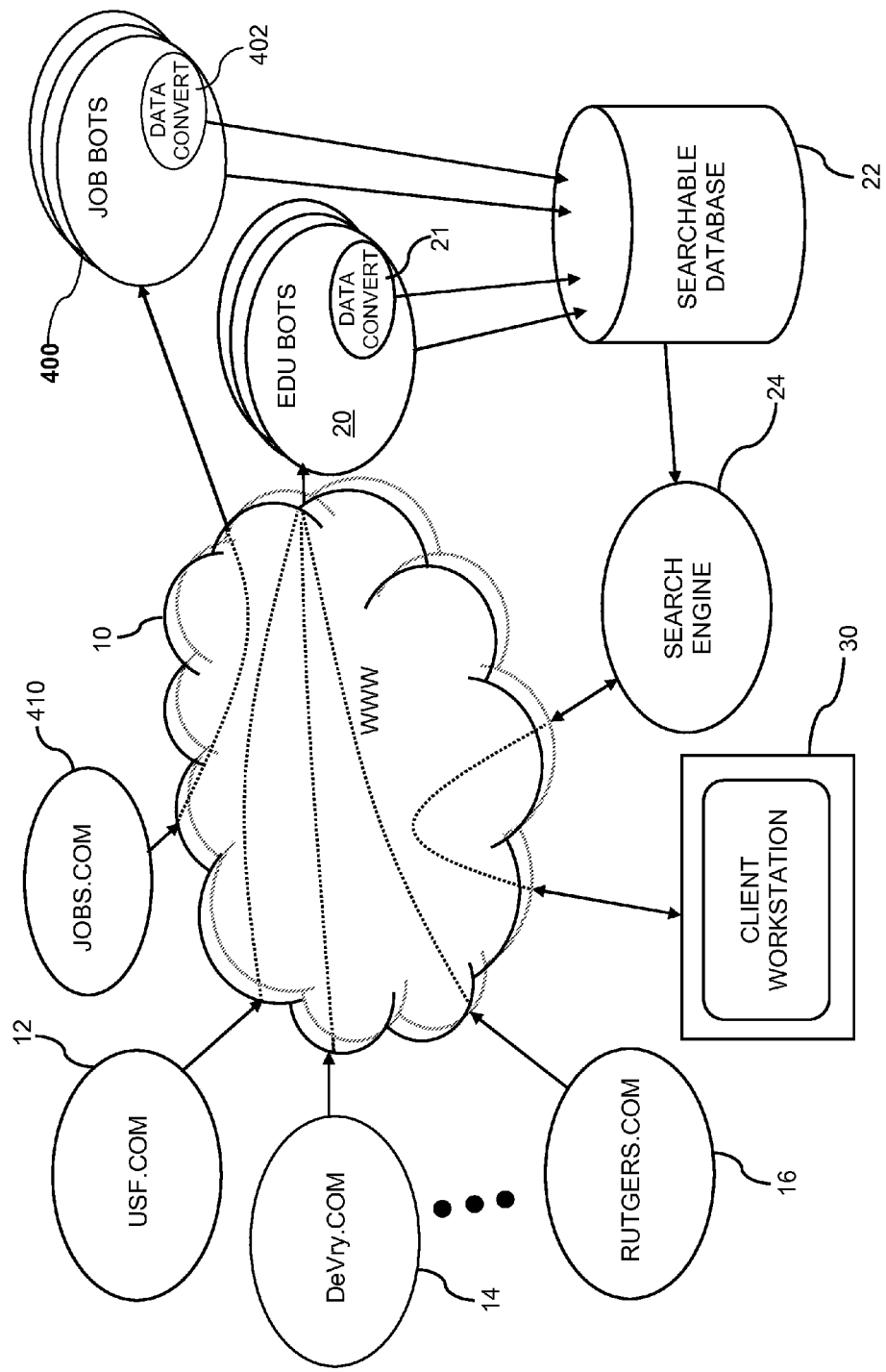
FIG. 15 illustrates a schematic view of a system of a second embodiment.

Referring to FIG. 15, a schematic view of a system of a second embodiment is shown. As previously discussed, one or more Edu bots 20 periodically visit educational program hosting sites 12/14/16 to extract educational program offering information, storing the educational program descriptions in the searchable database 22. The educational program hosting sites 12/14/16 are, for example, state university admission posting web sites such as the University of Southern Florida (USF) 12 and Rutgers 16; private education web sites such as Devry 14 and any known web site containing educational program information. This includes sites for any educational/training providers in any country.

A list of the target educational hosting sites is created by a person searching the network for such sites. For each particular hosting site such as sites 12/14/16, there is one or more corresponding edu bot 20 designed/programmed to find educational program content, parse information from the educational program content, normalize the information and store the information in the searchable educational course information database 22. For much of the information found in the educational information, the data is copied directly into a record of the searchable educational course information database 22. For example, the schema of the searchable educational course information database 22 has a field for prerequisites and the hosting site has a field for entry requirements, then that field is copied directly into the searchable record for that educational program data record. Alternately, if the educational program has a field for class meeting schedule (e.g. M/T/F 8:00 AM) and the searchable educational course information database 22 has a field for course meeting days and another field for course meeting time, then the field is parsed to place "M/T/F" into the field for course meeting days and "8:00 AM" in the field for meeting time by a data conversion routine 21.

In the prior embodiment, the educational seekers directly access the searchable database 22 through a search engine 24 that presents an educational opportunity search user interface on the educational seekers' workstation 30 (e.g. personal computer, hand-held device, cellular phone, etc). This generates any of many different types of searches and output reports that are anticipated ranging from a simple search to a very complex search and detailed report. An example of a simple search is "show me all CNA training classes in Florida." and an example of a more complex search is "show me all 4-year schools in Florida with majors in Biology and provide entrance requirements." The former, for example, results in a list of schools. The later, for example, results in a list of educational providers along with entry requirements for each educational provider/curriculum. For example, one educational provider requires a SAT score of 1000 for all students, but then for biology students, freshmen are required to take Chemistry I and II and at least two humanities classes, etc. The generated report include any or all data including the day/time of class meeting, location of classes, lab requirements, credit hours, teacher/professor, cost, cost per credit, pre-requisites, co-requisites, degree requirements, language of instruction, course/program goals, financial aid, placement programs, certifications of faculty, degree programs, certifications, etc.

In another embodiment, the system also includes job spidering bots 400. Job spidering bots 400 traverse job posting web sites such as private job posting sites (e.g. Monster) 410, corporate job posting sites, government job posting sites, educational institution job posting sites, etc. The Job spidering bots 400 extract job postings and store them in the searchable database 22. In some job spidering bots 400, a data converter 402 transforms the job postings into a common format. For example, all contact names are stored internally as first name, last name and the data converter 402 reverses the order of names that are in the job postings as last name, first name, etc.

Now, having a set of job postings as well as a list of educational opportunities stored in the searchable database 22, a jobseeker searches for job postings and is provided with extended features.

The search engine 24 has search tools to search the job postings in the searchable database 22. A job seeker enters information regarding the job they are seeking and the search engine 24 finds all relative job postings. In this embodiment, the search engine expands the search to related job postings for which the job seeker is under-qualified. Finding such job postings for which the job seeker is under-qualified, the search engine then identifies training that is needed that will make the job seeker qualified for the expanded list of job descriptions. The search engine then performs an auxiliary search of the educational opportunities in the searchable database to find educational descriptions, preferably in the location of the job seeker. By taking advantage of the educational opportunities, the job seeker then becomes qualified for some or the entire expanded list of job postings.

As an example, a job seeker enters information seeking a position as a Nurse and the search engine 24 finds all relative job postings. In this example, the search engine expands the search to related job postings for which the job seeker is under-qualified such as a nurse manager. Finding several job postings for a nurse manager, which the job seeker is under-qualified, the search engine then identifies management training that is needed to make the job seeker qualified for the nurse manager positions. The search engine performs an auxiliary search of the educational opportunities to find management coursework required by some or all of the nurse manager job postings, preferably in the location of the job seeker. By taking advantage of the educational opportunities, the job seeker will become qualified for some or all of the nurse manager job postings once completed. Such features improve a system that is designed to find jobs into a system that provides career advancement options/suggestions, etc.

Equivalent elements can be substituted for the ones set forth above such that they perform in substantially the same manner in substantially the same way for achieving substantially the same result.

It is believed that the system and method and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A method for creating and updating a consolidated database of educational programs and courses, the method comprising the steps of:
    manually identifying a set of educational programs and courses hosting sites;
    for each site within the set:
        manually programming and testing an edu bot specific to the each site by a programmer, the edu bot programmed to visit said each site and the edu bot programmed to extract educational program and course information from said each site and the edu bot programmed to store the educational program and course information in a searchable database; and
        running the edu bot to visit said each site through a network and extracting the educational program and course information into the searchable database; and
        a plurality of job spidering bots, said plurality of job spidering bots traversing job posting web sites through the network, said plurality of job spidering bots extracting job postings from said job posting web sites, said plurality of job spidering bots storing said extracted job postings in said searchable database;
    periodically running the edu bots to update the searchable database;
    providing a plurality of navigation buttons to said each educational programs and courses hosting site within the searchable database;
    searching the extracted job postings in said searchable database using a search engine, the search engine expanding the search of the extracted job postings to include job postings for which the job seeker is not qualified; and
    identifying educational opportunities through an auxiliary search of the extracted educational programs in said searchable database for the job seeker for said job postings for which the job seeker is not qualified.

2. The method according to claim 1, further comprising between the step of creating and the step of running, the step of:
    testing the edu bot against said each site to verify that the edu bot correctly extracts the educational program and course information.

3. The method according to claim 1, wherein the plurality of navigation buttons to said each educational programs and courses hosting site further comprising:
    a visit school button; and
    a visit department button.

4. The method according to claim 3, wherein the set of educational programs and courses hosting sites includes at least one web site selected from the group consisting of a university web site, a college web site and a technical school web site.

5. The method according to claim 4, wherein the plurality of navigation buttons to said each educational programs and courses hosting sites further comprising a course button.

6. A system for searching educational programs in a searchable database, the system comprising:
    a computer connected to a network;
    a storage device operationally interfaced to the computer;
    a searchable database stored within the storage device;
    a plurality of edu bots, said plurality of edu bots periodically visiting educational program hosting sites through the network, said plurality of edu bots extracting educational program and course information from the visited educational program hosting sites, said plurality of edu bots storing said extracted educational program and course information in said searchable database;
    providing a plurality of navigation buttons to said each educational program and course hosting site within the searchable database;
    a plurality of job spidering bots, said plurality of job spidering bots traversing job posting web sites through the network, said plurality of job spidering bots extracting job postings from said job posting web sites, said plurality of job spidering bots storing said extracted job postings in said searchable database;
    searching the extracted job postings in said searchable database using a search engine, the search engine expanding the search of the extracted job postings to include job postings for which the job seeker is not qualified; and
    identifying educational opportunities through an auxiliary search of the extracted educational programs in said searchable database for the job seeker for said job postings for which the job seeker is not qualified.

7. The system of claim 6, wherein the plurality of navigation buttons to said each educational program and course hosting site further comprising:
    a visit school button; and
    a visit department button.

8. The system of claim 7, wherein the plurality of navigation buttons to said each educational program and course hosting site further comprising a course button.

* * * * *